(12) United States Patent
Gulasekaran et al.

(10) Patent No.: US 8,989,081 B2
(45) Date of Patent: *Mar. 24, 2015

(54) TRANSMIT POWER ADAPTATION FOR WIRELESS COMMUNICATION SYSTEMS

(71) Applicant: QUALCOMM Incorporated, San Diego, CA (US)

(72) Inventors: Susinder R. Gulasekaran, Chennai (IN); Sasikiran Maddula, West Godavari Distric (IN)

(73) Assignee: QUALCOMM Incorporated, San Diego, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/846,472

(22) Filed: Mar. 18, 2013

(65) Prior Publication Data

US 2013/0215779 A1   Aug. 22, 2013

Related U.S. Application Data

(63) Continuation of application No. 12/640,553, filed on Dec. 17, 2009, now Pat. No. 8,422,420.

(51) Int. Cl.
  *H04B 7/185* (2006.01)
  *H04W 52/26* (2009.01)

(52) U.S. Cl.
  CPC .............. *H04W 52/267* (2013.01); *Y02B 60/50* (2013.01)
  USPC ............................. 370/318; 370/252; 370/278

(58) Field of Classification Search
  USPC .......................................... 370/252, 278, 318
  See application file for complete search history.

(56) References Cited

U.S. PATENT DOCUMENTS

| 5,396,516 A | 3/1995 | Padovani et al. |
| 7,046,649 B2 | 5/2006 | Awater et al. |
| 8,095,091 B1 | 1/2012 | Kopikare |
| 8,422,420 B1 * | 4/2013 | Gulasekaran et al. ........ 370/318 |

(Continued)

OTHER PUBLICATIONS

"CSR Bluetooth and IEEE 802.11b Co-Existence Solution", CSR BlueCore 2-External Feb. 2003, 20 pages.

(Continued)

*Primary Examiner* — Jason Mattis
(74) *Attorney, Agent, or Firm* — DeLizio Gilliam, PLLC

(57) ABSTRACT

When wireless systems are in communication with each other, transmit power levels can vary based on a distance between the communicating wireless systems. The transmit power levels may be varied by taking into consideration optimal values of performance indicators such as SNR. However, because a transmitting wireless system typically does not receive information that describes a communication channel as seen by a receiving wireless system, the transmitting wireless system may not be able to accurately determine when, whether, and by how much to reduce the transmit power without impairing signal reception ability at the receiving wireless system. Functionality can be implemented on the transmitting wireless system to vary the transmit power level based on comparing a percentage of packets transmitted at a maximum packet transmit rate with one or more thresholds. Such a variation of the transmit power levels can help reduce power consumption and ensure performance is not compromised.

22 Claims, 5 Drawing Sheets

(56) References Cited

U.S. PATENT DOCUMENTS

| | | | |
|---|---|---|---|
| 8,725,189 B2* | 5/2014 | Kazmi et al. | 455/522 |
| 2004/0141525 A1 | 7/2004 | Bhushan et al. | |
| 2006/0194546 A1 | 8/2006 | Gunnarsson et al. | |
| 2006/0239216 A1* | 10/2006 | Chen et al. | 370/310 |
| 2007/0060064 A1* | 3/2007 | Srikrishna et al. | 455/67.11 |
| 2008/0102879 A1 | 5/2008 | Heo et al. | |
| 2008/0159362 A1* | 7/2008 | Gelbman et al. | 375/219 |
| 2008/0200200 A1 | 8/2008 | Usuda et al. | |
| 2009/0006846 A1 | 1/2009 | Rosenblatt | |
| 2010/0322161 A1* | 12/2010 | Choi et al. | 370/329 |
| 2011/0317671 A1 | 12/2011 | Walton et al. | |
| 2013/0077506 A1* | 3/2013 | Hu et al. | 370/252 |

OTHER PUBLICATIONS

"CSR Co-Existence Scheme Definition", BlueCore 3-External Nov. 2003, 8 pages.

"How 802.11b/g WLAN and Bluetooth Can Play", Philips Sep. 2005, 5 pages.

"Three Wire Interface", Infineon Technologies Functional Design Document Oct. 4, 2004, 6 pages.

"Wi-Fi and Bluetooth—Interference Issues", Hewlett Packard Jan. 2002, 6 pages.

"U.S. Appl. No. 12/640,553 Final Office Action", Oct. 2, 2012, 8 pages.

"U.S. Appl. No. 12/640,553 Office Action", May 22, 2012, 11 pages.

Co-pending U.S. Appl. No. 12/640,553, filed Dec. 17, 2009.

* cited by examiner

TRANSMIT POWER ADAPTATION FOR WIRELESS COMMUNICATION SYSTEMS

RELATED APPLICATIONS

This application is a continuation application of United States of America application Ser. No. 12/640,553 filed on Dec. 17, 2009.

BACKGROUND

Embodiments of the inventive subject matter generally relate to the field of wireless communication networks and, more particularly, to transmit power level adaptation for wireless communication systems.

Transmit power, in wireless communication systems, is typically set at a maximum possible level and is adjusted to achieve optimal performance and throughput. In some cases, the transmit power level of the wireless communication system may be varied depending on a distance between a transmitting and a receiving wireless system so that a specified signal-to-noise ratio is satisfied.

SUMMARY

Various embodiments are disclosed for transmit power level adaptation for wireless communication systems. In some embodiments, a packet transmit rate for at least a subset of a plurality of packets transmitted in a first window of a predefined number of packets at a first transmit power level is determined at a network device. A percentage of packets, from the subset of the plurality of packets, transmitted at a preferred packet transmit rate is determined. A transmit power level associated with the network device is adjusted based, at least in part, on the percentage of packets, from the subset of the plurality of packets, that are transmitted at the preferred packet transmit rate.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
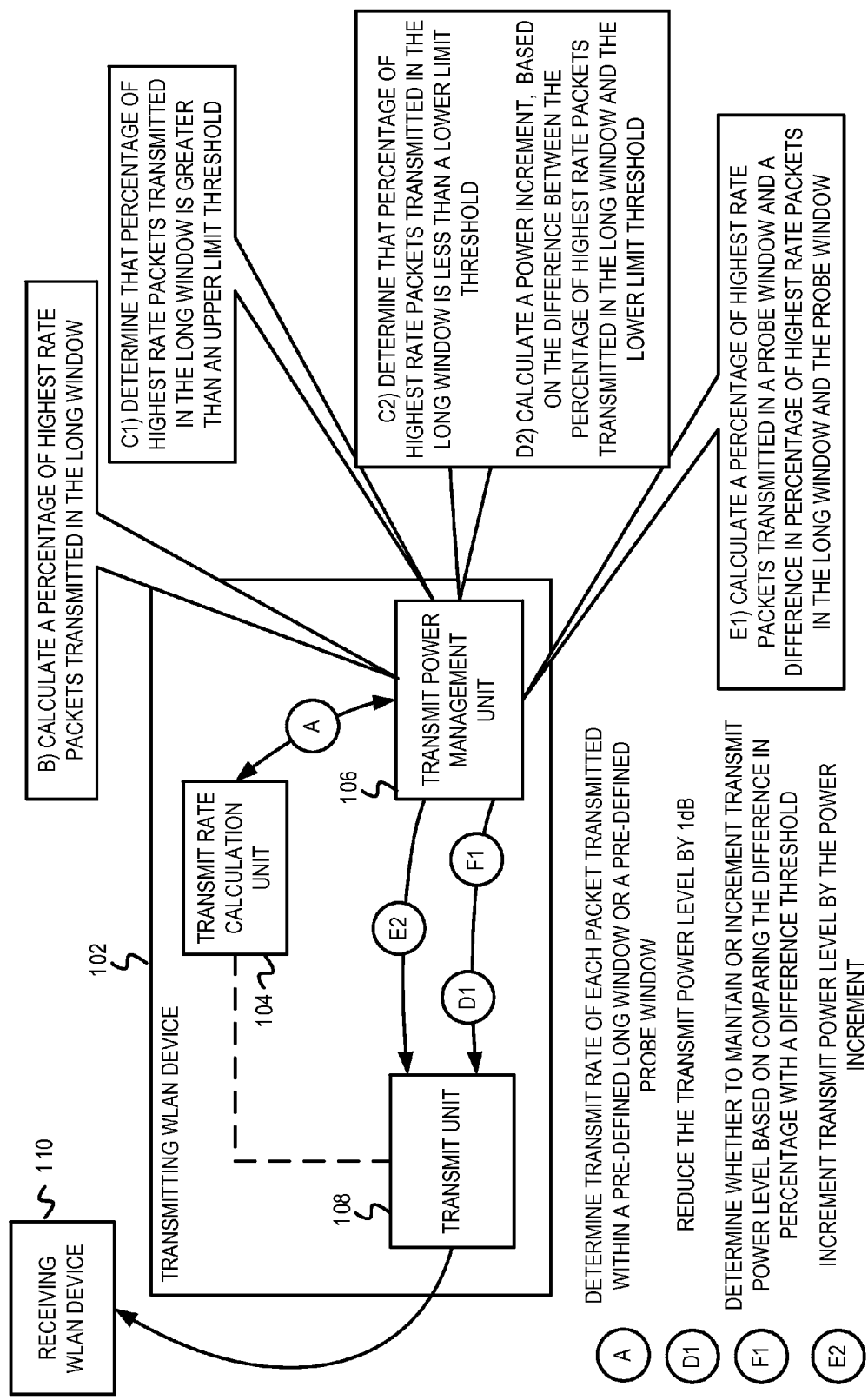
FIG. 1 is an example block diagram illustrating a mechanism for transmit power level adaptation.

The description that follows includes exemplary systems, methods, techniques, instruction sequences, and computer program products that embody techniques of the present inventive subject matter. However, it is understood that the described embodiments may be practiced without these specific details. For instance, although examples refer to techniques for transmit power adaptation in wireless local area network (WLAN) devices, in some embodiments, the techniques for transmit power adaptation may also be implemented for other wireless standards and devices, e.g., Bluetooth®, WiMAX, ZigBee®, Wireless USB devices, etc. In other instances, well-known instruction instances, protocols, structures, and techniques have not been shown in detail in order not to obfuscate the description.

Transmit power levels in wireless systems (e.g., WLAN devices) are typically set at a maximum acceptable power level and may be varied depending on the proximity of a receiving WLAN device to a transmitting WLAN device. Various techniques can be implemented for varying the transmit power level of the transmitting WLAN device so that signal to noise ratio (SNR) is maintained at an optimal level and throughput and performance are not compromised. However, the transmitting WLAN device typically does not have information that describes a communication channel as seen by the receiving WLAN device. Also, the transmitting WLAN device usually does not receive information such as received signal strength information (RSSI), error vector measurement (EVM), etc. from the receiving WLAN device. Without this information, it is difficult for the transmitting WLAN device to determine when, whether, and by how much to reduce the transmit power level so as not to impair the receiving WLAN device's ability to receive signals without any errors or interference. Moreover, a bidirectional symmetric communication channel between the transmitting WLAN device and the receiving WLAN device cannot be assumed because of a possible difference in transmit power levels (e.g., the transmitting WLAN device may transmit to multiple receiving WLAN devices at a higher power), channel effects (e.g., effect of interference, signal reflection) etc. Also, configuring the receiving WLAN device to reduce its transmit power level based on received beacon signals or other high power received signals from the transmitting WLAN device (e.g., an access point) may result in inaccurate transmit power levels, which in turn can result in a degradation of WLAN performance and throughput.

Functionality can be implemented to adapt the transmit power level of the transmitting WLAN device without compromising the WLAN performance. A transmit power management unit can be configured to vary the transmit power level based on a percentage of packets transmitted at a highest packet transmit rate. The percentage of the packets transmitted at the highest packet transmit rate can be used as an indicator of the WLAN performance and throughput, and may also be a function of the distance between the transmitting and the receiving WLAN devices. For example, to achieve maximum throughput, the transmitting WLAN device should transmit most of its packets at the maximum packet transmit rate. By determining the transmit power level based on the percentage of packets transmitted at the highest packet transmit rate, the transmit power level can be varied so as to directly control the WLAN performance. By reducing the transmit power level based on the percentage of packets transmitted at the highest packet transmit rate, the transmitting WLAN device can reduce power consumption and also reduce the amount of interference presented to other wireless devices. For example, in scenarios where the transmitting WLAN device is collocated with another wireless device (e.g., a Bluetooth device), reducing the transmit power level based on the percentage of packets transmitted at the highest packet transmit rate can improve performance of the collocated devices, reduce interference between the collocated devices, minimize performance degradation and front-end saturation, etc.

FIG. 1 is an example block diagram illustrating a mechanism for transmit power level adaptation. FIG. 1 depicts two WLAN devices 102 and 110. The WLAN device 102 comprises a transmit unit 108, a transmit rate calculation unit 104, and a transmit power management unit 106. The transmit power management unit 106 communicates with the transmit unit 108 and the transmit rate calculation unit 104. Also, the transmit rate calculation unit 104 is coupled with the transmit unit 108. In one example, the WLAN device 102 may be a transmitting WLAN device, while the WLAN device 110 may be a receiving WLAN device.

The transmit power management unit 106 implements functionality to adapt a transmit power level based on a percentage of highest rate packets transmitted within a pre-defined window of packets as will be described below.

At stage A, the transmit power management unit 106 determines a packet transmit rate for each packet transmitted within a pre-defined long window. In one implementation, the length of the long window may be specified in terms of a number of packets. For example, the length of the long window may be 1000 packets. The transmit power management unit 106 may determine the packet transmit rate for each of the 1000 packets transmitted within the long window. It is noted, however, that in other examples the length of the long window may be any suitable number of packets. The transmit rate calculation unit 104 may notify the transmit power management unit 106 of the packet transmit rate for each of the packets transmitted the long window. The transmit rate calculation unit 104 may implement a packet transmit rate adaptation algorithm to control the packet transmit rate at which packets are transmitted. In some cases, the transmitting WLAN device 102 transmits a packet or a set of packets to the receiving WLAN device 110 and waits for an acknowledgement (e.g., an ACK packet) from the receiving WLAN device 110. In one implementation, based on whether or not the transmitting WLAN device 102 receives the acknowledgement from the receiving WLAN device 110, the transmit rate calculation unit 104 estimates a packet error rate (PER) and chooses a packet transmit rate to maximize performance, throughput, signal to noise ratio, etc. The transmit rate calculation unit 104 may vary the packet transmit rate based on channel condition (e.g., a number of packets dropped or incorrectly received at the receiving WLAN device 110), distance between the transmitting WLAN device 102 and the receiving WLAN device 110, etc. The transmit rate calculation unit 104 may vary the packet transmit rate and select a higher packet transmit rate when the transmitting WLAN device 102 and the receiving WLAN device 110 are in close proximity and select lower transmit packet rates as the distance between the transmitting WLAN device 102 and the receiving WLAN device 110 increases. This can help ensure that maximum possible throughput is achieved at any physical location. The transmit rate calculation unit 104 may also notify the transmit unit 108 of the transmit rate at which the packet should be transmitted.

At stage B, the transmit power management unit 106 calculates a percentage of packets in the long window that were transmitted at the highest packet transmit rate ("percentage of highest rate packets transmitted in the long window"). When the transmitting WLAN device 102 and the receiving WLAN device 110 set up a communication link, the two WLAN devices 102 and 110 can negotiate and agree upon a maximum packet transmit rate (e.g., PHY rate) during association. In one implementation, the transmit power management unit 106 can compare the packet transmit rates of each of the packets transmitted in the long window (determined at stage A) against the maximum packet transmit rate, and calculate a percentage of the packets (in the long window) that were transmitted at the maximum packet transmit rate. In another implementation, the transmit power management unit 106 may identify the packets with the highest packet transmit rate in the long window (e.g., by applying a max function) and accordingly calculate the percentage of highest rate packets transmitted in the long window.

At stage C1, the transmit power management unit 106 determines that the percentage of highest rate packets transmitted in the long window is greater than an upper limit threshold. For example, the transmit power management unit 106 may determine that the percentage of highest rate packets transmitted in the long window is 95%, that the upper limit threshold is 90%, and therefore that the percentage of highest rate packets transmitted in the long window is greater than the upper limit threshold.

At stage D1, the transmit power management unit 106 directs the transmit unit 108 to reduce the transmit power level by 1 dB. In some implementations, the transmit power management unit 106 may direct the transmit unit 108 to reduce the transmit power level by any suitable increment (e.g., 0.5 dB, 2 dB, etc.) and transmit packets at a reduced transmit power level. Additionally, the transmit power management unit 106 may also schedule a probe window. In some implementations, the probe window may be a shorter window than the long window described above. For example, if the length of the long window is 1000 packets, the length of the probe window may be 200 packets. The transmit power management unit 106 may interface with the transmit rate calculation unit 104 to determine packet transmit rates of each packet transmitted in the probe window as described with reference to stage A. After the transmit power management unit 106 receives indications of the packet transmit rates of each packet transmitted in the probe window from the transmit rate calculation unit 104, the transmit power management unit 106 may analyze the packet transmit rates of packets transmitted in the probe window. In doing so, the transmit power management unit 106 may try to determine whether reducing the transmit power level impacts the packet transmit rate.

At stage E1, the transmit power management unit 106 calculates a percentage of packets in the probe window that were transmitted at the highest packet rate ("percentage of highest rate packets transmitted in the probe window") and a difference between the percentages of the highest rate packets transmitted in the long window and the probe window. In one implementation, the transmit power management unit 106 analyses the packet transmit rates of the packets in the probe window and calculates the percentage of highest rate packets transmitted in the probe window. For example, the transmit power management unit 106 may determine that the percentage of highest rate packets transmitted in the probe window is 90%. The transmit power management unit 106 may then subtract the percentage of highest rate packets transmitted in the probe window from the percentage of highest rate packets transmitted in the long window. If the percentage of highest rate packets transmitted in the long window is 95%, the transmit power management unit 106 may determine that the difference between the percentages of highest rate packets transmitted in the long window and the probe window is 5%.

At stage F1, the transmit power management unit 106 determines whether to maintain or increment the transmit power level based on comparing the difference between the percentages of highest rate packets transmitted in the long window and the probe window with a difference threshold. The transmit power management unit 106 can use the difference threshold to determine whether or not reducing the transmit power level impacts the performance of the transmitting WLAN device 102. For example, if the difference between the percentages of highest rate packets transmitted in the long window and the probe window is 5% and the difference threshold is 2%, the transmit power management unit 106 may determine that the reduction of the transmit power level negatively impacts the percentage of highest rate packets transmitted in the long window and hence the performance of the transmitting WLAN device 102. The transmit power management unit 106 may accordingly direct the transmit unit 108 to increment the reduced transmit power level, as will be further described below. Alternately, if the difference between the percentages of highest rate packets transmitted in the long window and the probe window is 1% and the difference threshold is 2%, the transmit power management unit 106 may determine that the reducing the transmit power has a negligible impact on the percentage of highest rate packets transmitted in the long window and hence the performance of the transmitting WLAN device 102. The transmit power management unit 106 may accordingly direct the transmit unit to maintain the transmit power level at the reduced transmit power level.

In some implementations, the transmit power management unit 106 performs operations in stages C2-E2 if the transmit power management unit 106 determines that the percentage of highest rate packets transmitted in the long window is not greater than or equal to the upper limit threshold.

At stage C2, the transmit power management unit 106 determines that the percentage of highest rate packets transmitted in the long window is less than a lower limit threshold. For example, the transmit power management unit 106 may determine that the percentage of highest rate packets transmitted in the long window is 45%, that the lower limit threshold is 60%, and therefore that the percentage of highest rate packets transmitted in the long window is less than the lower limit threshold. It should be noted that in some implementations, the transmit power management unit 106 does not vary the transmit power level if the percentage of highest rate packets transmitted in the long window falls within the upper limit threshold and the lower limit threshold.

At stage D2, the transmit power management unit 106 calculates a power increment based on a difference between the percentage of highest rate packets transmitted in the long window and the lower limit threshold. For example, if the percentage of highest rate packets transmitted in the long window is 45% and the lower limit threshold is 60%, the difference between the percentage of highest rate packets transmitted in the long window and the lower limit threshold is 15%. The transmit power management unit 106 may refer to a graph of power attenuation versus percentage of highest rate packets, determined based on historical analysis, simulations, etc., and calculate the power increment required to increase the percentage of highest rate packets transmitted in the long window to at least the lower limit threshold. For example, the transmit power management unit 106 may determine that by increasing the transmit power level by 5 dB, the percentage of highest rate packets transmitted in the long window can be increased from 45% to 60%. The operations of stage D2 will be described in greater detail below with reference to FIGS. 4A and 4B.

At stage E2, the transmit power management unit 106 increments the transmit power level by the power increment. With reference to the previous example, the transmit power management unit 106 may direct the transmit unit 108 to increase the transmit power level by 5 dB. Additionally, in some implementations, the transmit power management unit 106 may also communicate the change in the transmit power level to the transmit rate calculation unit 104, so that the transmit rate calculation unit 104 can calculate an appropriate packet transmit rate.

Figure 2:
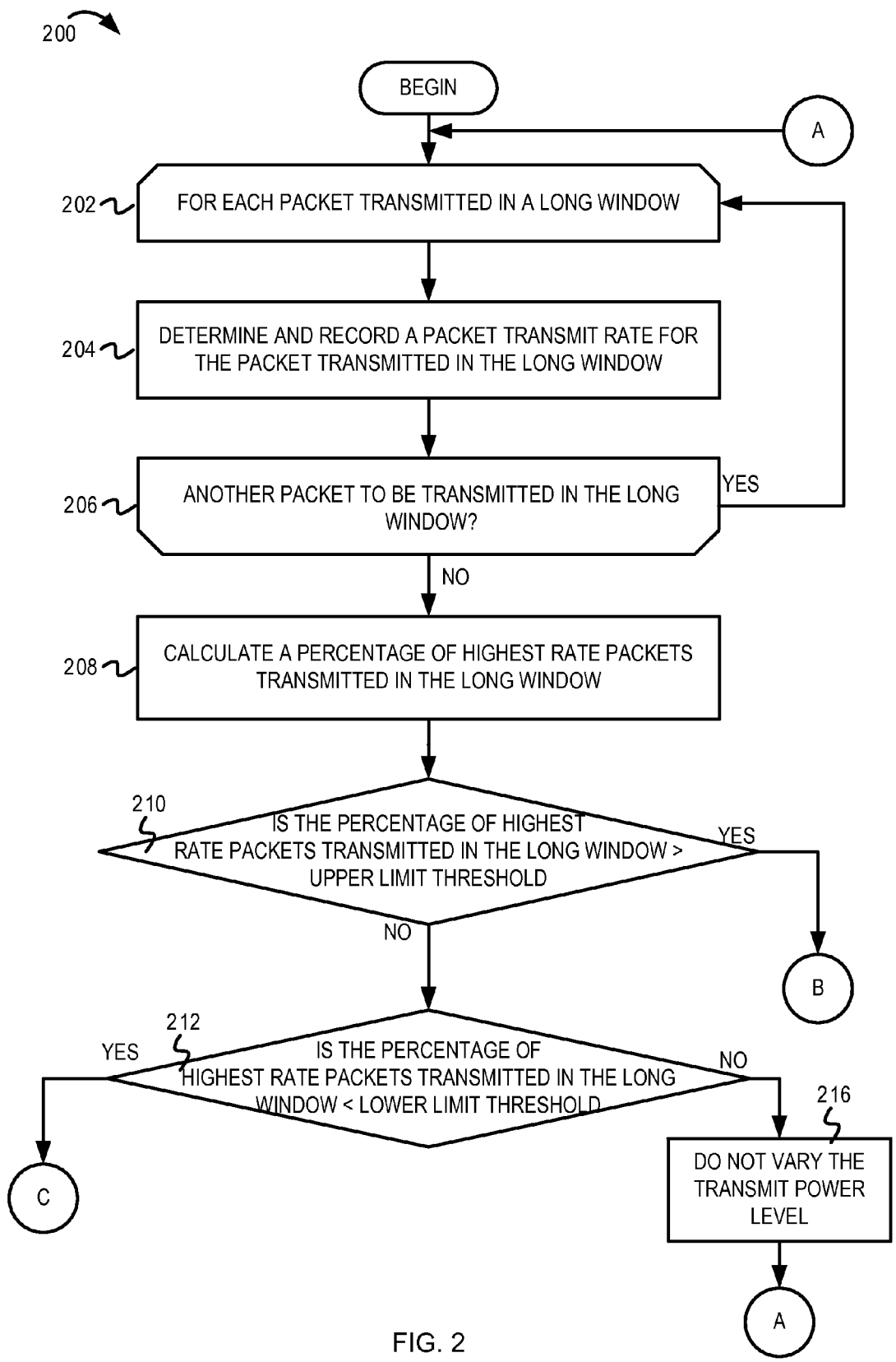
FIG. 2 is a flow diagram illustrating example operations for transmit power level modification based on a number of highest rate packets transmitted.
Figure 3:
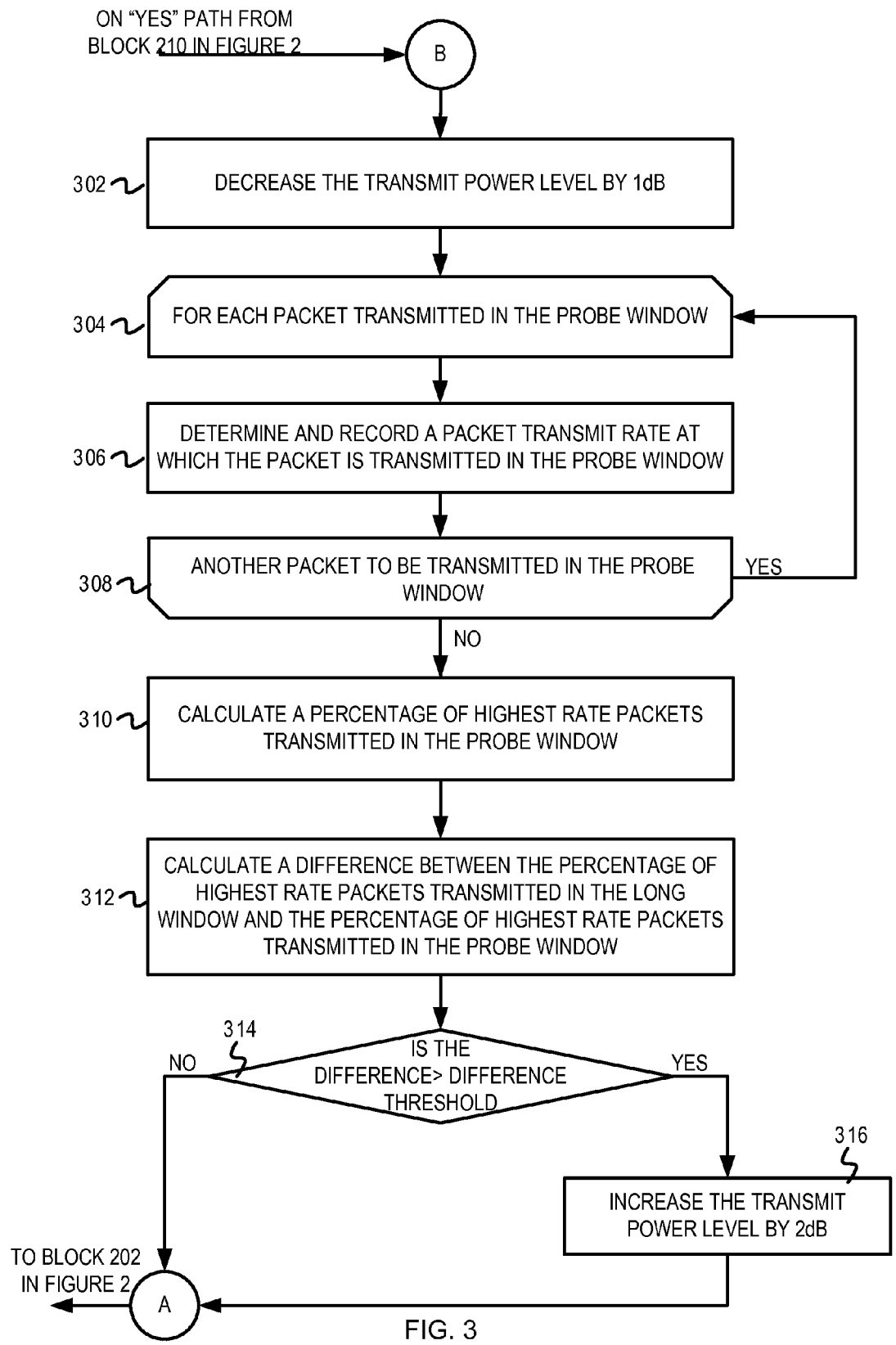
FIG. 3 is a flow diagram illustrating example operations for transmit power level modification based on a number of highest rate packets transmitted.
Figure 4A:
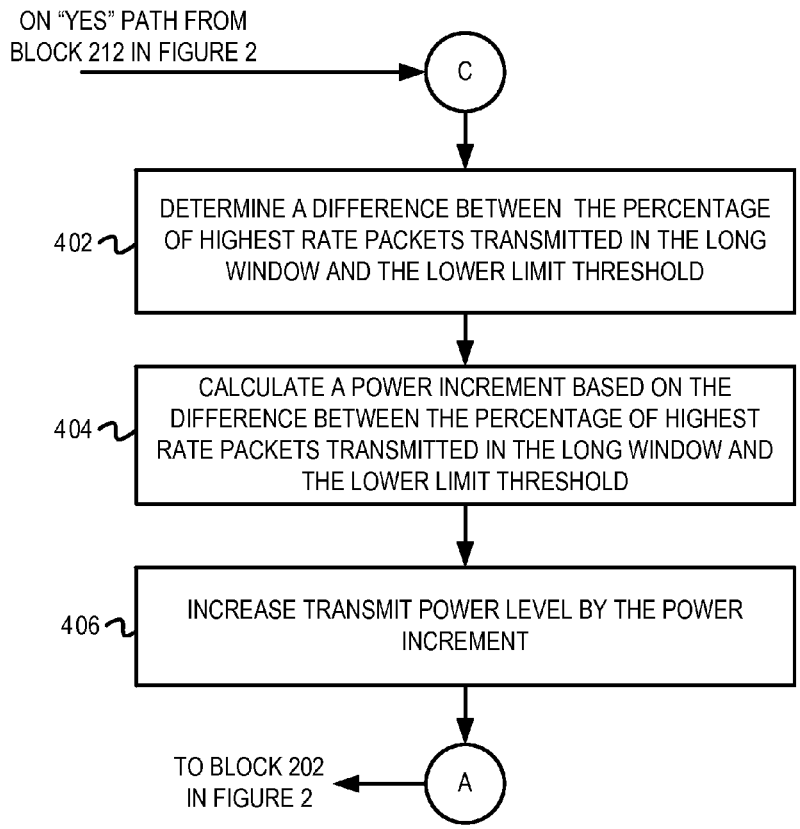
FIG. 4A is a flow diagram illustrating example operations for transmit power level modification based on a number of highest rate packets transmitted.

FIG. 2, FIG. 3, and FIG. 4A depict flow diagrams illustrating example operations for transmit power level modification based on a number of highest rate packets transmitted. Flow 200 begins at block 202 in FIG. 2.

At block 202, a loop begins for each packet in a long window. In one implementation, the transmit power management unit 106 of WLAN device 102 (shown in FIG. 1) may analyze each packet transmitted in the long window. The number of packets in the long window may be predefined, and in one example may be determined based on simulations, estimates of a number of packets required for estimating transmit power levels, etc. The flow continues at block 204.

At block 204, the packet transmit rate is determined and recorded. In one implementation, the transmit power management unit 106 may determine and record the packet transmit rate for the packet transmitted in the long window. A packet rate calculation unit 104 may use a packet rate adaptation algorithm to determine an optimal packet transmit rate for each packet or a set of packets. The packet rate calculation unit 104 may direct a transmit unit 108 to transmit the packet(s), at the calculated packet transmit rate, to a receiving WLAN device 110. In one implementation, the transmitting WLAN device 102 may be an access point while the receiving WLAN device 110 may be a WLAN client that connects to the access point. In another implementation, the transmitting WLAN device 102 and the receiving WLAN device 110 may be clients that are part of a peer-to-peer communication network. The packet rate calculation unit 104 may also notify the transmit power management unit 106 of the packet transmit rate so that the transmit power management unit 106 can record the packet transmit rate of the packet transmitted in the long window. The flow continues at block 206.

At block 206, it is determined whether there exists another packet to be transmitted in the long window. If the transmit power management unit 106 determines that there exists another packet to be transmitted in the long window, the flow loops back to block 202, where the transmit power management unit 106 determines and records a packet transmit rate for the next packet to be transmitted in the long window. The transmit power management unit 106 may determine that there are additional packets to be transmitted in the long window by keeping track of a number of packets that were transmitted. For example, if the length of the long window is 1000 packets, the transmit power management unit 106 may execute the loop beginning at block 202 until the transmit power management unit 106 determines and records 1000 packet transmit rates. If the transmit power management unit 106 determines that packet transmit rates for all the packets transmitted in the long window have been recorded, the loop for the packets in the long window ends, and the flow continues at block 208.

At block 208, a percentage of highest rate packets transmitted in the long window is determined. For example, the transmit power management unit 106 may calculate the percentage of highest rate packets transmitted in the long window. In one implementation, the transmit power management unit 106 may compare the recorded packet transmit rates against a maximum acceptable packet transmit rate (e.g., agreed upon by the transmitting WLAN device 102 and the receiving WLAN device 110 during communication link setup), and determine a number of recorded packet transmit rates that match the maximum acceptable packet transmit rate. In another implementation, the transmit power management unit 106 may compare the recorded packet transmit rates, identify a maximum value of the recorded packet transmit rates (e.g., using a max ( ) function), and identify a number of packets that were transmitted at the maximum value of the recorded packet transmit rates. After the transmit power management unit 106 calculates the percentage of highest rate packets transmitted in the long window, the flow continues at block 210.

At block 210, it is determined whether the percentage of highest rate packets transmitted in the long window is greater than an upper limit threshold. For example, the transmit power management unit 106 may determine whether the percentage of highest rate packets transmitted in the long window is greater than the upper limit threshold. The upper limit threshold may be predefined and in one example may be determined based on the maximum packet transmit rate, a behavior of the transmit rate calculation unit 104, etc. In one implementation, the upper limit threshold may be 90%. In another implementation, the upper limit threshold may be another suitable value, e.g., 80% or 85%. If the transmit power management unit 106 determines that the percentage of highest rate packets transmitted in the long window is greater than the upper limit threshold, the flow continues at block 302 in FIG. 3. Otherwise, the flow continues at block 212.

At block 212, it is determined whether the percentage of highest rate packets transmitted in the long window is less than a lower limit threshold. For example, the transmit power management unit 106 may determine whether the percentage of highest rate packets transmitted in the long window is less than the lower limit threshold. In one implementation, the lower limit threshold may be 60%. In other implementations, the lower limit threshold may be other suitable values, e.g., 50% or 55%. If the transmit power management unit 106 determines that the percentage of packets transmitted in the long window is less than the lower limit threshold, the flow continues at block 402 in FIG. 4. Otherwise, the flow continues at block 216.

At block 216, the transmit power level is not varied. The transmit power management unit 106 may determine that the transmit power level should be maintained at the current level if the transmit power management unit 106 determines that the percentage of highest rate packets transmitted in the long window falls between the upper limit threshold and the lower limit threshold. The percentage of highest rate packets between the upper limit threshold and the lower limit threshold may be considered to be a stable region, and the transmit power management unit 106 may not vary the transmit power level if the percentage of highest rate packets in the long window lies within the stable region. This can prevent oscillations and continuous changes in transmit power level. In one implementation, the transmit power management unit 106 may not transmit a notification to the transmit unit 108, if the transmit power management unit 106 determines that the transmit power level should not be varied. From block 216, the flow loops back to block 202, where a new long window begins. For example, if packets 1 through 1000 comprised a first long window, the flow 200 would loop back to block 202 (after block 216) and analyze packets 1001 through 2000 in a second long window.

At block 302, the transmit power level is decreased by 1 dB. The flow 200 moves from block 210 in FIG. 2 to block 302 in FIG. 3 if it is determined that the percentage of highest rate packets transmitted in the long window is greater than the upper limit threshold. In one implementation, the transmit power management unit 106 may direct the transmit unit 108 to decrease the transmit power level by 1 dB and transmit subsequent packets at a reduced transmit power level. It is noted, however, that in other implementations the transmit power management unit 106 may direct the transmit unit 108 to decrease the transmit power level by other suitable values (e.g., 0.5 dB, 1.5 db, etc.). In some implementations, the value by which the transmit power level is decreased may be predefined. In other implementations, the value by which the transmit power level is decreased may be dynamically determined based on a difference between the upper limit threshold and the percentage of highest rate packets transmitted in the long window. Additionally, the transmit power management unit 106 also schedules a probe window to analyze the effect of the decrease in the transmit power level on the performance of the transmitting WLAN device 102. The flow continues at block 304.

At block 304, a loop is begun for each packet in the probe window. The transmit power management unit 106 may analyze each packet transmitted in the probe window. The length of the probe window is shorter than the length of the long window. In one implementation, the length of the probe window is five times shorter than the length of the long window. For example, if the length of the long window is 1000 packets, the length of the probe window may be 200 packets. In other implementations, the probe window can be other suitable lengths (e.g., 250 or 300 packets). The flow continues at block 306.

At block 306, the packet transmit rate for the packet in the probe window is determined and recorded. The transmit power management unit 106 may determine and record the packet transmit rate for the packet transmitted in the probe window. As described earlier, in one implementation, the packet rate calculation unit 104 may notify the transmit power management unit 106 of the packet transmit rate so that the transmit power management unit 106 can record the packet transmit rate of the packet transmitted in the probe window. The flow continues at block 308.

At block 308, it is determined whether there exists another packet to be transmitted in the probe window. If the transmit power management unit 106 determines that there exists another packet to be transmitted in the probe window, the flow loops back to block 304, where the transmit power management unit 106 determines and records a packet transmit rate for the next packet in the probe window. If the transmit power management unit 106 determines that packet transmit rates for all the packets transmitted in the probe window have been recorded, the loop for the packets transmitted in the probe window ends, and the flow continues at block 310.

At block 310, a percentage of highest rate packets transmitted in the probe window is determined. For example, the transmit power management unit 106 may calculate the percentage of highest rate packets in the probe window as described with reference to block 208. After the transmit power management unit 106 calculates the percentage of highest rate packets in the probe window, the flow continues at block 312.

At block 312, a difference between the percentage of highest rate packets transmitted in the long window (determined at block 208) and the percentage of highest rate packets transmitted in the probe window (determined at block 310) is calculated. In one implementation, the transmit power management unit 106 may calculate the difference between the percentages of highest rate packets transmitted in the long window and the probe window by subtracting the percentage of highest rate packets transmitted in the probe window from the percentage of highest rate packets transmitted in the long window. The flow continues at block 314.

At block 314, it is determined whether the difference between the percentages of highest rate packets transmitted in the long window and the probe window is greater than a difference threshold. For example, the transmit power management unit 106 may determine whether the difference between the percentages of highest rate packets transmitted in the long window and the probe window is greater than the difference threshold. In one implementation, the difference threshold may be 2%. By comparing the difference between the percentages of highest rate packets transmitted in the long window and the probe window against the difference threshold, the transmit power management unit 106 can determine whether or not reducing the transmit power level impacts the performance of the transmitting WLAN device 102. The transmit power management unit 106 can also determine whether to maintain or increment the reduced transmit power level. For example, if the difference between the percentages of highest rate packets transmitted in the long window and the probe window is 3% and the difference threshold is 5%, the transmit power management unit 106 may determine that the reduction of the transmit power level has a negligible impact on the percentage of highest rate packets and hence the performance of the transmitting WLAN device 102. The transmit power management unit 106 may accordingly direct the transmit unit 108 to maintain and continue transmitting packets at the reduced transmit power level. If the transmit power management unit 106 determines that the difference between the percentages of highest rate packets transmitted in the long window and the probe window is less than the difference threshold, the flow continues at block 202 in FIG. 2, where a new long window begins. For example, if packets 1 through 1000 were transmitted in a first long window and packets 1001 through 1200 were transmitted in the probe window, after the flow 200 loops back to block 202 (on the "no" path of block 314), the packet transmit rates of packets 1201 through 2200 may be analyzed in a second long window. It should be noted that in some implementations the transmit power management unit 106 reduces the transmit power level (e.g., by 1 dB) until the transmit power management unit 106 determines that a reduction in the transmit power level causes a degradation in performance (i.e., until the difference between the percentages of highest rate packets transmitted in the long window and the probe window is greater than the difference threshold). If the transmit power management unit 106 determines that the difference between the percentages of highest rate packets transmitted in the long window and the probe window is greater than the difference threshold, the flow continues at block 316.

At block 316, the reduced transmit power level is increased by 2 dB. In one implementation, the transmit power management unit 106 can direct the transmit unit 108 to increase the reduced transmit power level by 2 dB. For example, if the difference between the percentages of highest rate packets transmitted in the long window and the probe window is 10%, and the difference threshold is 2%, the transmit power management unit 106 may determine that the reduction of the transmit power level reduces the percentage of highest rate packets and hence the performance of the transmitting WLAN device 102. The transmit power management unit 106 may accordingly direct the transmit unit to increment the reduced transmit power level. The transmit power management unit 106 may direct the transmit unit 108 to increment the reduced transmit power level to offset the power reduction (at block 302) and also to account for a safety margin. In other words, the transmit power management unit 106 may direct the transmit unit 108 to increment the transmit power level by 2 dB to offset the 1 dB reduction in the transmit power level and to provide a 1 dB power safety margin. In other implementations, the transmit power management unit 106 can direct the transmit unit 108 to increase the reduced transmit power level by other suitable values depending on the difference between the percentages of highest rate packets transmitted in the long window and the probe window. From block 316, the flow continues at block 202 in FIG. 2, where a new long window begins.

FIG. 4A is a flow diagram illustrating example operations for transmit power level modification based on a number of highest rate packets transmitted. The flow 200 moves from block 212 in FIG. 2 along the "yes" path to block 402 in FIG. 4 if it is determined that the percentage of highest rate packets transmitted in the long window is less than the lower limit threshold. FIG. 4A begins at block 402.

At block 402, a difference between the percentage of highest rate packets transmitted in the long window (determined at block 208) and the lower limit threshold is calculated. In one implementation, the transmit power management unit 106 may calculate the difference between the percentage of the highest rate packets transmitted in the long window and lower limit threshold by subtracting the percentage of highest rate packets transmitted in the long window from the lower limit threshold. The flow continues at block 404.

Figure 4B:
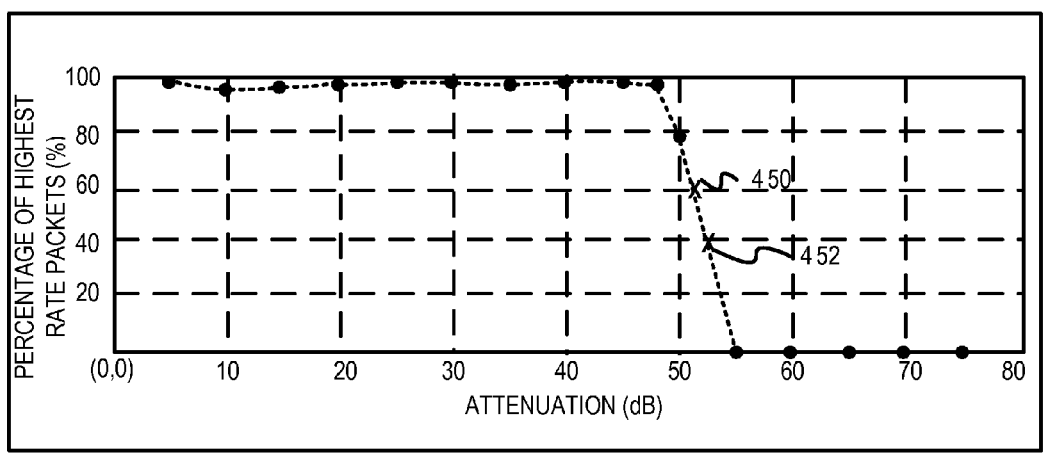
FIG. 4B illustrates a graph of channel attenuation versus a percentage of transmitted highest rate packets.

At block 404, a power increment is calculated based on the difference between the percentage of highest rate packets transmitted in the long window and the lower limit threshold (determined at block 402). In one implementation, the transmit power management unit 106 may calculate the power increment. The transmit power management unit 106 may determine the power increment based on a graph of channel attenuation (X-axis) versus percentage of transmitted highest rate packets (Y-axis), e.g., the graph illustrated in FIG. 4B. The graph of FIG. 4B may be pre-determined based on simulations, analysis of historical data, experimental data, etc. In some implementations, the graph of channel attenuation versus percentage of transmitted highest rate packets may also be updated at regular intervals based on received data. In FIG. 4B, points 452 and 450 on the graph respectively indicate that the percentage of highest rate packets in the long window is 40% and that the upper limit threshold is 60%. The transmit power management unit 106 may accordingly calculate and determine that the difference between the percentage of the highest rate packets transmitted in the long window and the lower limit threshold is 20%. The transmit power management unit 106 may read corresponding values of attenuation for the points 450 and 452 from the graph and calculate a slope of the graph between the two points 450 and 452. The slope of the graph (m) may be calculated using Eq. 1, where $(x_{th})$ is the attenuation at the lower limit threshold percentage $(y_{th})$ (60%, in this example), abs( ) denotes the absolute value, and x is the attenuation at the percentage (y) of highest rate packets transmitted in the long window (40%, in this example).

$$m = \text{abs}\left(\frac{y_{th} - y}{x_{th} - x}\right) \qquad \text{Eq. 1}$$

The transmit power management unit 106 may then calculate the inverse of the slope of the graph (inv(m)) to obtain the power increment. In other implementations, the transmit power management unit 106 may access a look-up table that indicates the difference between the percentage of highest rate packets transmitted in the long window and the lower limit threshold and a corresponding power increment. From block 404, the flow continues at block 406.

At block 406, the transmit power level is incremented by the power increment. In one implementation, the transmit power management unit 106 can direct the transmit unit 108 to increase the transmit power level by the power increment. In some implementations, the transmit power management unit 106 may also communicate the increase in the transmit power level by the power increment to the transmit rate calculation unit 104, to enable accurate calculation of packet transmit rates for subsequent packets. From block 406, the flow ends.

It should be understood that the depicted flow diagrams (FIGS. 2-4) are examples meant to aid in understanding embodiments and should not be used to limit embodiments or limit scope of the claims. Embodiments may perform additional operations, fewer operations, operations in a different order, operations in parallel, and some operations differently. For instance, although examples specify the lengths of the long window and the probe window in terms of a number of packets (e.g., 1000 packets in the long window, etc.), in some implementations, the lengths of the long window and the probe window may be defined in terms of a time interval. For example, the long window may be an X second time interval and may comprise packets transmitted within the X second interval. The time intervals for the long window and the probe window may be selected so that a sufficient number of packets are transmitted and received within the selected time intervals. Also, the thresholds (e.g., the upper limit threshold, lower limit threshold, difference threshold, etc.) need not be percentage thresholds. The thresholds may be defined as numbers, ratios, or any suitable indications. A corresponding indication of the number of highest rate packets transmitted in the long/probe window may be determined and compared against the thresholds.

It should also be noted that operations for transmit power level adaptation may be closely linked to whether or not the receiving WLAN device 110 receives the transmitted packets. In some implementations, the transmit power management unit 106 may direct the transmit unit 108 to increase the transmit power level to a maximum acceptable power limit (e.g., as defined by power regulations, capabilities of the transmitting WLAN device 102, etc.), if the transmit power management unit 106 determines that the receiving WLAN device 110 dropped a packet. The transmit power management unit 106 may determine that the receiving WLAN device 110 dropped the packet based on detecting a retransmission request, a NACK, not receiving an acknowledgement for the packet, etc. The transmit power management unit 106 may determine that the receiving WLAN device 110 dropped the packet if both WLAN hardware and software retransmission attempts fail. For example, the transmit power management unit 106 may determine that the receiving WLAN device 110 dropped the packet after two retransmission attempts at a maximum packet transmit rate, two retransmission attempts at a next lower packet transmit rate, and one retransmission attempt at a still lower packet transmit rate. After the transmit power level is increased to the maximum acceptable power limit, the transmit power management unit 106 may perform operations as described in FIGS. 1-4 to determine whether and by how much the transmit power level can be reduced.

In some implementations, the transmit power management unit 106 may monitor the percentage of highest rate packets transmitted in the long window while receiving and recording the packet transmit rates of the packets in the long window (at block 204). For example, in scenarios where the transmitting WLAN device 102 and/or the receiving WLAN device 110 are moving, if the percentage of highest rate packets falls below a threshold level (e.g., 50%), the transmit power management unit 106 may increment the transmit power level by a large increment (e.g., 5 dB). In some implementations, the threshold level may be the same as the lower limit threshold. In other implementations, the threshold level may be set to a level below the lower limit threshold. The transmit power management unit 106 may not wait until the packet transmit rates of all packets to be transmitted in the long window have been recorded. For example, after receiving the packet transmit rates for 100 out of 1000 packets in the long window, the transmit power management unit 106 may determine that the percentage of highest rate packets is 45%. The transmit power management unit 106 may direct the transmit unit 108 to increment the transmit power level by a large value, e.g., 5 dB. The transmit power management unit 106 may start a new long window and perform operations for transmit power level adaptation as described above.

Also, in some implementations, the transmit power level may not be varied during transmission of control packets such as clear-to-send (CTS) packets, request-to-send (RTS) packets, ACK packets, etc., to help ensure that all WLAN devices receive the control packets for proper operations, communication channel contention control, etc. In some implementations, the transmit power management unit 106 may use two different power levels—a first power level for transmitting the control packets, and a second power level (determined based on the above-described operations for transmit power level adaptation) for transmitting other packets. In some implementations, the first transmit power level may be equal to the maximum allowable transmit power level.

It should also be noted that the operations for transmit power level adaptation as described in FIGS. 1-4 may be performed in a multi-link scenario. For example, the transmitting WLAN device 102 may be an access point, which is connected to multiple receiving WLAN devices. Each of the receiving WLAN devices may be at a different distance from the transmitting WLAN device 102 and may have different communication parameters (e.g., packet-transmit rates, etc.). The transmitting WLAN device 102 can perform the operations for transmit power level adaptation on the communication links for each of the receiving WLAN devices, and may vary the transmit power level for communication with each of the receiving WLAN devices. For example, the transmitting WLAN device 102 may transmit to a first receiving WLAN device at a first transmit power level, and also transmit to a second receiving WLAN device at a second transmit power level. The first and the second transmit power levels may be determined based on the transmit power level adaptation technique described above.

The operations for transmit power level adaptation may be implemented to improve coexistence between the transmitting WLAN device 102 and a collocated Bluetooth device. By reducing the transmit power level in the WLAN device, the amount of interference presented, by the WLAN device, to the collocated Bluetooth device can be reduced. This can result in enhanced Bluetooth performance without sacrificing WLAN performance. By not reducing the transmit power level when the receiving WLAN device is far away from the transmitting WLAN device, the WLAN performance in terms of packet transmit rate and transmission range can be preserved in a coexistence environment. Also, Bluetooth 3.0 devices, typically use Bluetooth protocols to exchange control packets (e.g., for link set up, contention control, etc.) and WLAN protocols to exchange data packets. Because the communication range of Bluetooth protocols (e.g., 10 m) is much smaller than that of the WLAN protocols (e.g., 100 m), the communicating Bluetooth 3.0 devices may be in close proximity and, therefore, WLAN transmit power level adaptation may enable improved Bluetooth and WLAN coexistence. The operations for transmit power level adaptation may also be implemented on mobile devices (e.g., mobile phones with WLAN capabilities, mobile access points, etc.) and other battery operated WLAN devices or WLAN devices with limited available power. Lastly, if the transmit power management unit 106 determines that the transmitting WLAN device 102 is in close proximity to the receiving WLAN device (e.g., in peer-to-peer communications, communications involving soft access points, etc.) transmitting at a lower transmit power level can conserve power, reduce interference, etc. Moreover, in implementing the operations for transmit power level adaptation, case temperature for the WLAN devices can also be reduced, thus increasing the life of the WLAN device.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
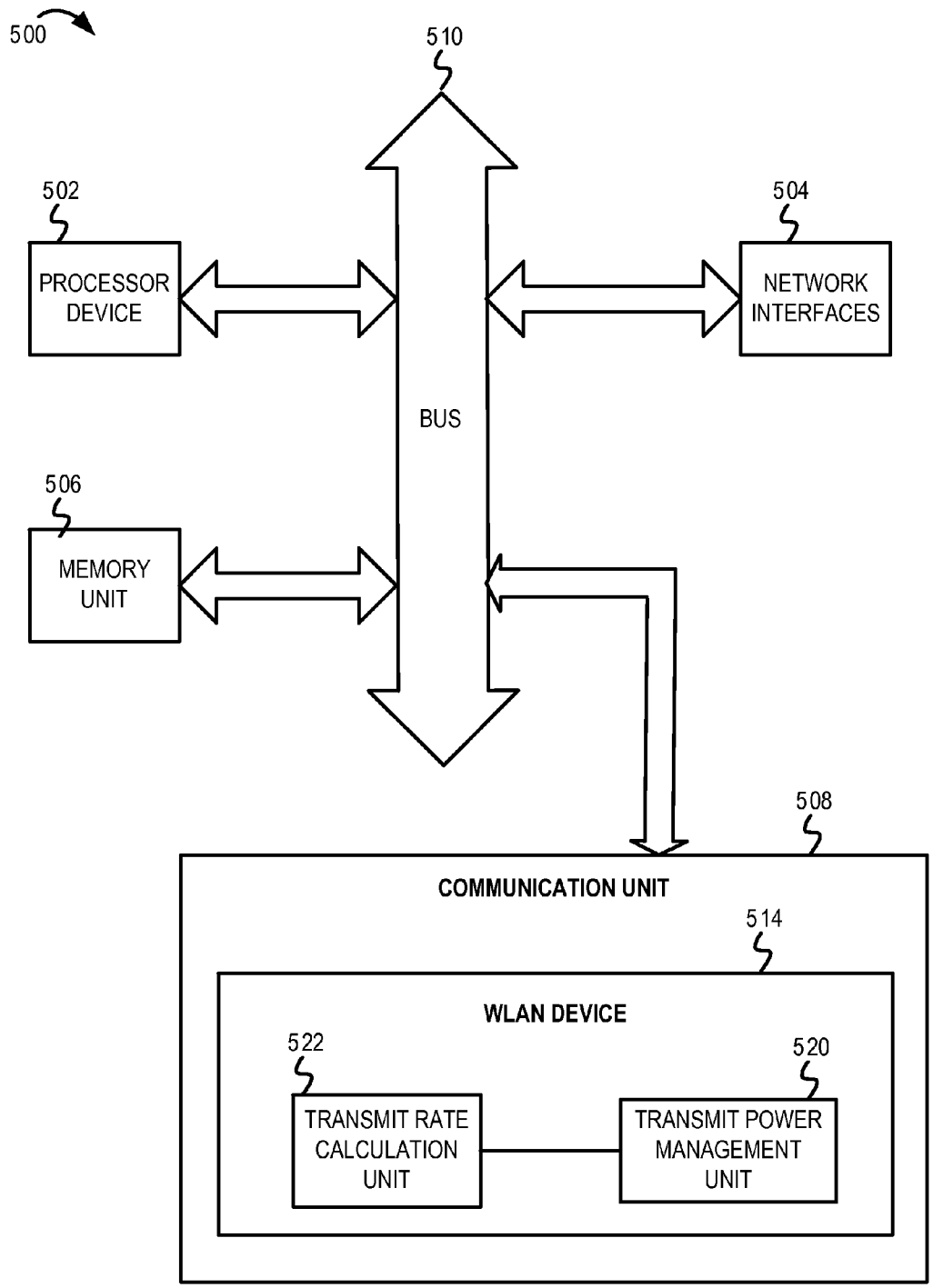
FIG. 5 is a block diagram of one embodiment of a computer system including a mechanism to dynamically adapt a transmit power level in a WLAN device.

FIG. 5 is a block diagram of one embodiment of a computer system 500 including a mechanism to dynamically adapt a transmit power level in a WLAN device. In some implementations, the computer system 500 may be one of a personal computer (PC), a laptop, a netbook, a mobile phone, a personal digital assistant (PDA), a gaming device, or other electronic systems comprising a WLAN device. The computer system 500 may also comprise other collocated devices. For example, the computer system 500 may comprise a Bluetooth device collocated with the WLAN device. The computer system 500 includes a processor device 502 (possibly including multiple processors, multiple cores, multiple nodes, and/or implementing multi-threading, etc.). The computer system 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 510 (e.g., PCI, ISA, PCI-Express, HyperTransport®, Infini-Band®, NuBus, etc.), and network interfaces 504 that include at least one wireless network interface (e.g., a WLAN interface, a Bluetooth® interface, a WiMAX interface, a ZigBee® interface, a Wireless USB interface, etc.).

The computer system 500 also includes a communications unit 508. The communications unit 508 comprises WLAN device 514. As mentioned above, in some implementations, the communication unit 508 may also comprise a collocated Bluetooth device (not shown) or any suitable communication device (e.g., WiMAX, ZigBee, etc.). The WLAN device 514 comprises a transmit rate calculation unit 522 coupled to a transmit power management unit 520. The transmit rate calculation unit 522 can calculate a packet transmit rate for each packet to be transmitted by the WLAN device 514 and can communicate the packet transmit rate to the transmit power management unit 520. The transmit power management unit 520 can accordingly determine a percentage of highest rate packets transmitted in a pre-defined window of packets, determine whether a current transmit power level should be modified, and accordingly direct a transmit unit to modify the current transmit power level. The transmit power management unit 520 may compare the percentage of highest rate packets transmitted in the pre-defined window of packets against an upper and a lower threshold to determine whether the current transmit power level should be modified, and also to determine a power difference by which the current transmit power level should be incremented or decremented as described with reference to FIGS. 1-4. The transmit power management unit 520 may repeatedly perform the above-described operations until the percentage of highest rate packets transmitted in a pre-defined window of packets lies within the upper and the lower thresholds.

It should be noted that any one of the above-described functionalities might be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., additional network interfaces, peripheral devices, etc.). The processor unit 502 and the network interfaces 504 are coupled to the bus 510. Although illustrated as being coupled to the bus 510, the memory 506 may be coupled to the processor unit 502.

While the embodiments are described with reference to various implementations and exploitations, it will be understood that these embodiments are illustrative and that the scope of the inventive subject matter is not limited to them. In general, techniques for transmit power level adaptation in wireless systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for communicating via a network, the method comprising:
    determining, at a network device, packet transmit rates for at least a subset of a first plurality of packets transmitted in a first window by the network device at a first power level;
    determining a first percentage of packets of at least the subset of the first plurality of packets, wherein the first percentage of packets are transmitted at a first transmit rate; and
    adjusting the first power level based, at least in part, on the first percentage of packets.

2. The method of claim 1, wherein said adjusting the first power level is based, at least in part, on:
    comparing the first percentage of packets to a threshold.

3. The method of claim 1, wherein said adjusting the first power level comprises:
    in response to determining that the first percentage of packets is greater than a first threshold, reducing the first power level by a first amount to a second power level;
    determining packet transmit rates for at least a subset of a second plurality of packets transmitted by the network device at the second power level in a second window;
    determining a second percentage of packets of at least the subset of the second plurality of packets, wherein the second percentage of packets are transmitted in the second window at the first transmit rate; and
    determining if a first difference between the first percentage of packets and the second percentage of packets exceeds a second threshold.

4. The method of claim 3, wherein the first amount is determined based, at least in part, on a second difference between the first threshold and the first percentage of packets.

5. The method of claim 3, further comprising:
    incrementing the second power level by a second amount to a third power level, in response to determining that the first difference exceeds the second threshold.

6. The method of claim 5, wherein the third power level is greater than the first power level and the second power level.

7. The method of claim 3, further comprising:
    maintaining the second power level for subsequent transmissions from the network device, in response to determining that the first difference does not exceed the second threshold.

8. The method of claim 1, wherein said adjusting the first power level comprises,
    determining that the first percentage of packets is less than a threshold; and
    determining a difference between the first percentage of packets and the threshold.

9. The method of claim 8, further comprising:
    determining an incremental power level by which to increase the first power level based, at least in part, on the difference between the first percentage of packets and the threshold; and
    increasing the first power level by the incremental power level for subsequent transmissions from the network device.

10. The method of claim 9, wherein said determining the incremental power level comprises:
    determining the incremental power level based, at least in part, on the first percentage of packets and an attenuation of a communication channel.

11. The method of claim 9, wherein said determining the incremental power level comprises:
    calculating an inverse of a slope of a graph between a first attenuation of a communication channel corresponding to the first percentage of packets and a second attenuation of the communication channel corresponding to the threshold.

12. The method of claim 1, further comprising:
    determining that the first percentage of packets is between a first threshold and a second threshold; and
    maintaining the first power level for subsequent transmissions from the network device.

13. The method of claim 1, further comprising:
    determining that a packet of the first plurality of packets was dropped at a receiving wireless device; and
    incrementing the first power level to a second power level for subsequent transmissions from the network device.

14. The method of claim 1, wherein said determining the first percentage of packets comprises:
    determining a second percentage of packets from at least the subset of the first plurality of packets transmitted at a second transmit rate that is greater than a third transmit rate negotiated between the network device and a receiving network device, or
    determining a third percentage of packets from at least the subset of the first plurality of packets transmitted at a fourth transmit rate that is equal to a fifth transmit rate at which a first packet of the first plurality of packets was transmitted.

15. A non-transitory machine-readable storage medium having instructions stored therein, which when executed by a processor cause the processor to perform operations that comprise:
    determining packet transmit rates for at least a subset of a first plurality of packets transmitted in a first window by a network device at a first power level;
    determining a first percentage of packets of at least the subset of the first plurality of packets, wherein the first percentage of packets are transmitted at a first transmit rate; and
    adjusting the first power level associated with the network device based, at least in part, on the first percentage of packets.

16. The non-transitory machine-readable storage medium of claim 15, wherein said adjusting the first power level comprises:
    in response to determining that the first percentage of packets is greater than a threshold, reducing the first power level by a first amount to a second power level;

determining packet transmit rates for at least a subset of a second plurality of packets transmitted by the network device at the second power level in a second window;

determining a second percentage of packets of at least the subset of the second plurality of packets, wherein the second percentage of packets are transmitted in the second window at the first transmit rate; and incrementing the second power level based, at least in part, on a difference between the first percentage of packets and the second percentage of packets.

17. The non-transitory machine-readable storage medium of claim 15, wherein adjusting the first power level comprises:

in response to determining that the first percentage of packets is less than a threshold, determining a difference between the first percentage of packets and the threshold;

determining an incremental power level by which to increase the first power level based, at least in part, on the difference between the first percentage of packets and the threshold; and increasing the first power level by the incremental power level for subsequent transmissions from the network device.

18. The non-transitory machine-readable storage medium of claim 15, wherein determining the first percentage of packets comprises:

determining a second percentage of packets from at least the subset of the first plurality of packets transmitted at a second transmit rate that is greater than a third transmit rate negotiated between the network device and a receiving network device, or determining a third percentage of packets from at least the subset of the first plurality of packets transmitted at a fourth transmit rate that is equal to a fifth transmit rate at which a first packet of the first plurality of packets was transmitted.

19. A network device comprising:

a processor;

a memory having instructions stored therein which, when executed by the processor, cause the network device to:

determine packet transmit rates for at least a subset of a first plurality of packets transmitted in a first window by the network device at a first power level;

determine a first percentage of packets of at least the subset of the first plurality of packets transmitted at a first transmit rate; and adjust the first power level based, at least in part, on the first percentage of packets.

20. The network device of claim 19, wherein the instructions further cause the network device to:

reduce the first power level by a first amount to a second power level, in response to a determination that the first percentage of packets is greater than a threshold;

determine packet transmit rates for at least a subset of a second plurality of packets transmitted by the network device at the second power level in a second window;

determine a second percentage of packets of at least the subset of the second plurality of packets, wherein the second percentage of packets are transmitted in the second window at the first transmit rate; and increment the second power level based, at least in part, on a difference between the first percentage of packets and the second percentage of packets.

21. The network device of claim 19, wherein the instructions further cause the network device to: adjust the first power level in response to a determination that the first percentage of packets is less than a threshold, determine a difference between the first percentage of packets and the threshold;

determine an incremental power level by which to increase the first power level based on the difference between the first percentage of packets and the threshold; and increase the first power level by the incremental power level for subsequent transmissions from the network device.

22. The network device of claim 19, wherein the instructions to determine the first percentage of packets further cause the network device to:

determine a second percentage of packets from at least the subset of the first plurality of packets that were transmitted at a second transmit rate that is greater than a third transmit rate negotiated between the network device and a receiving network device, or determine a third percentage of packets from at least the subset of the first plurality of packets that were transmitted at a fourth transmit rate that is equal to a fifth transmit rate at which a first of the first plurality of packets was transmitted.

* * * * *